US008768295B2

(12) United States Patent
Cutler et al.

(10) Patent No.: US 8,768,295 B2
(45) Date of Patent: Jul. 1, 2014

(54) METHOD OF HANDLING A CHANGE TO BEARER CONTROL MODE

(75) Inventors: Kevin Scott Cutler, Carp (CA); Jeff Allan Kerluke, Stittsville (CA)

(73) Assignee: Alcatel Lucent, Paris (FR)

( * ) Notice: Subject to any disclaimer, the term of this patent is extended or adjusted under 35 U.S.C. 154(b) by 526 days.

(21) Appl. No.: 12/708,246

(22) Filed: Feb. 18, 2010

(65) Prior Publication Data

US 2011/0201303 A1   Aug. 18, 2011

(51) Int. Cl.
  *H04M 11/00* (2006.01)
  *H04W 36/00* (2009.01)
  *H04W 4/00* (2009.01)
  *H04W 72/00* (2009.01)
  *H04L 12/00* (2006.01)
  *G06F 15/16* (2006.01)

(52) U.S. Cl.
  USPC ........ 455/405; 709/227; 455/436; 455/432.1; 455/433; 455/450; 370/235; 370/351; 370/328

(58) Field of Classification Search
  None
  See application file for complete search history.

(56) References Cited

U.S. PATENT DOCUMENTS

2010/0154029 A1 *  6/2010  Fernandez Alonso et al. ... 726/1

FOREIGN PATENT DOCUMENTS

WO    WO 2009118038 A1 * 10/2009
WO    WO 2009132722 A1 * 11/2009

OTHER PUBLICATIONS

C3-070651 3GPP TSG SA WG2 Architecture, S2#58 (Reply LS on PCC handling of bearer control mode changes due to handover; Published Jun. 2007.*
3GPP TS 29.213 V9.1.0 (Published: Dec. 2009) 3rd Generation Partnership Project; Technical Specification Group Core Network and Terminals; Policy and Charging Control signalling flows and QoS parameter mapping; (Release 9).*
3GPP TS 29.212 V9.1.0 (Published: Dec. 2009) 3rd Generation Partnership Project; Technical Specification Group Core Network and Terminals; Policy and Charging Control over Gx reference point (Release 9).*
"Universal Mobile Telecommunications System (UMTS); LTE; Policy and charging control over Gx reference point (3GPP TS 29.212 version 9.1.0 Release 9)", Technical Specification, European Telecommunications Standards Institute (ETSI). 650. Route Des Lucioles; F-06921 Sophia-Antipolis; France, No. V.1.0, Jan. 1, 2010.

(Continued)

*Primary Examiner* — Dwayne Bost
*Assistant Examiner* — Nalini Mummalaneni
(74) *Attorney, Agent, or Firm* — Kramer Amado P.C.

(57) ABSTRACT

Various exemplary embodiments relate to a method and related network node and machine-readable storage medium including one or more of the following: receiving, at the PCRN, a request message from an Evolved Packet Core node; determining whether the request message includes a request for a modification to an IP-CAN session; and if the request message includes a request for a modification to the IP-CAN session: determining a current bearer control mode for the IP-CAN session, determining a previous bearer control mode for the IP-CAN session, comparing the current bearer control mode to the previous bearer control mode, and if the current bearer control mode is different from the previous bearer control mode, modifying the IP-CAN session according to the current bearer control mode.

20 Claims, 5 Drawing Sheets

(56) References Cited

OTHER PUBLICATIONS

"Digital cellular telecommunication system (Phase 2+): Universal Mobile Telecommunications System (UMTS); LTE; Policy and charging control signalling flows and Quality of Service (Qos) parameter mapping (3GPP TS 29.213 version 9.1.0 Release 9)" Techincal Specification, European Telecommunications Standards Institute (ETSI), 650, Route Des Lucioles; F-06921 Sophia-Antipolis; France, No. V9.1.0, Jan. 1, 2010.

"Universal Mobile Telecommunications System (UMTS); LTE; Policy and charging control overRx reference point (3Gpp TS 29.214 version 9.2.0 Release 9)" Technical Specification, European Telecommunications Standards Institute (ETSI), 650, Route Des Lucioles; F-06921 Sophia-Antipolis; France No. V9.2.0 Jan. 1, 2010.
International Search Report dated Jun. 27, 2011 for corresponding PCT Application No. PCT/US2011/000475.

* cited by examiner

| IPCAN_SESSION_MODIFICATION | |
|---|---|
| {a=x; b=y} | UE_ONLY |
| {a=z} | UE_NW |
| ... | |
| IPCAN_SESSION_ESTABLISH | |
| ... | |
| GWC_SESSION_ESTABLISH | |
| ... | |
| ... | |

| RULE NAME | IP-CAN SESSION | NETWORK INITIATED? | DEFERRED? | DEFERRAL WAIT TIME |
|---|---|---|---|---|
| 0xE426 | 0x53FF | NO | NO | - |
| 0x99B2 | 0x53FF | YES | NO | - |
| 0x4502 | 0xCF37 | YES | YES | 180ms |
| ... | ... | ... | ... | ... |

METHOD OF HANDLING A CHANGE TO BEARER CONTROL MODE

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order provide reliable data services and charge subscribers for use thereof.

The 3GPP specifications further describe methods of data plane traffic propagation. Data plane traffic is to be carried from the user equipment to the packet data network via virtual connections called "service data flows (SDFs)." Each SDF is to be carried by a virtual container called a "bearer." Each bearer is associated with specific quality of service (QoS) characteristics and may carry multiple SDFs. Thus, particular QoS settings may be assured for an SDF by associating the SDF with a matching bearer.

As described by 3GPP TS 29.212, 3GPP TS 29.213, and 3GPP TS 29.214, SDFs may be established in various manners. For example, SDFs may be established at the request of an Application Function (AF) associated with the provider of a service associated with the requested SDF. Such requests may be referred to as "network-initiated" requests. SDFs may also be established at the request of user equipment (UE). These requests may arrive at the PCRF from the Serving Gateway (SGW) or Packet Data Network Gateway (PGW) and are referred to as "UE-initiated" requests. In some situations a request for an SDF may involve multiple messages, originating from both an AF and a UE.

Depending on factors such as the equipment serving a particular SDF, the EPC may not be able to fulfill all types of SDF requests. For example, in some implementations, network-initiated requests may not be allowed. 3GPP TS 29.212 describe a setting called "bearer control mode" which indicates what requests should be processed for a particular IP-CAN session. Bearer control mode may be set to a value of "UE_ONLY," indicating that the UE must request any resource establishment, modification, or termination; or "UE_NW," indicating that both network-initiated and UE-initiated requests are to be fulfilled.

The 3GPP specifications do not, however, describe how the PCRF should determine which bearer control mode setting is appropriate for a given IP-CAN session. The 3GPP specifications also fail to describe how the PCRF should identify and handle a situation where the bearer control mode should be changed. Without these steps, it becomes difficult for the EPC to provide reliable resource allocations that adapt to the needs of a mobile device and serving hardware.

In view of the foregoing, it would be desirable to provide a method for handling resource allocation requests. In particular, it would be desirable to provide a PCRF that may flexibly respond to resource allocation requests requiring an assessment of the bearer control mode for an SDF associated with the request. It would further be desirable to provide a PCRF that can handle a change to a bearer control mode associated with an SDF without introducing undesirable effects or violating any relevant specifications.

SUMMARY

In light of the present need for a method for dynamically handling resource allocation requests involving a determination of bearer control mode, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node and machine-readable storage medium including one or more of the following: receiving, at the PCRN, a request message from an Evolved Packet Core node; determining whether the request message includes a request for a modification to an IP-CAN session; and if the request message includes a request for a modification to the IP-CAN session: determining a current bearer control mode for the IP-CAN session, determining a previous bearer control mode for the IP-CAN session, comparing the current bearer control mode to the previous bearer control mode, and if the current bearer control mode is different from the previous bearer control mode, modifying the IP-CAN session according to the current bearer control mode.

It should be apparent that, in this manner, various exemplary embodiments enable the flexible determination of a bearer control mode and assurance of compliance with a changed bearer control mode. Particularly, by removing non-compliant PCC rules, QoS rules, and application sessions after a bearer control mode change, a PCRN may ensure that only valid sessions remain after a change to a bearer control mode for an IP-CAN session.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
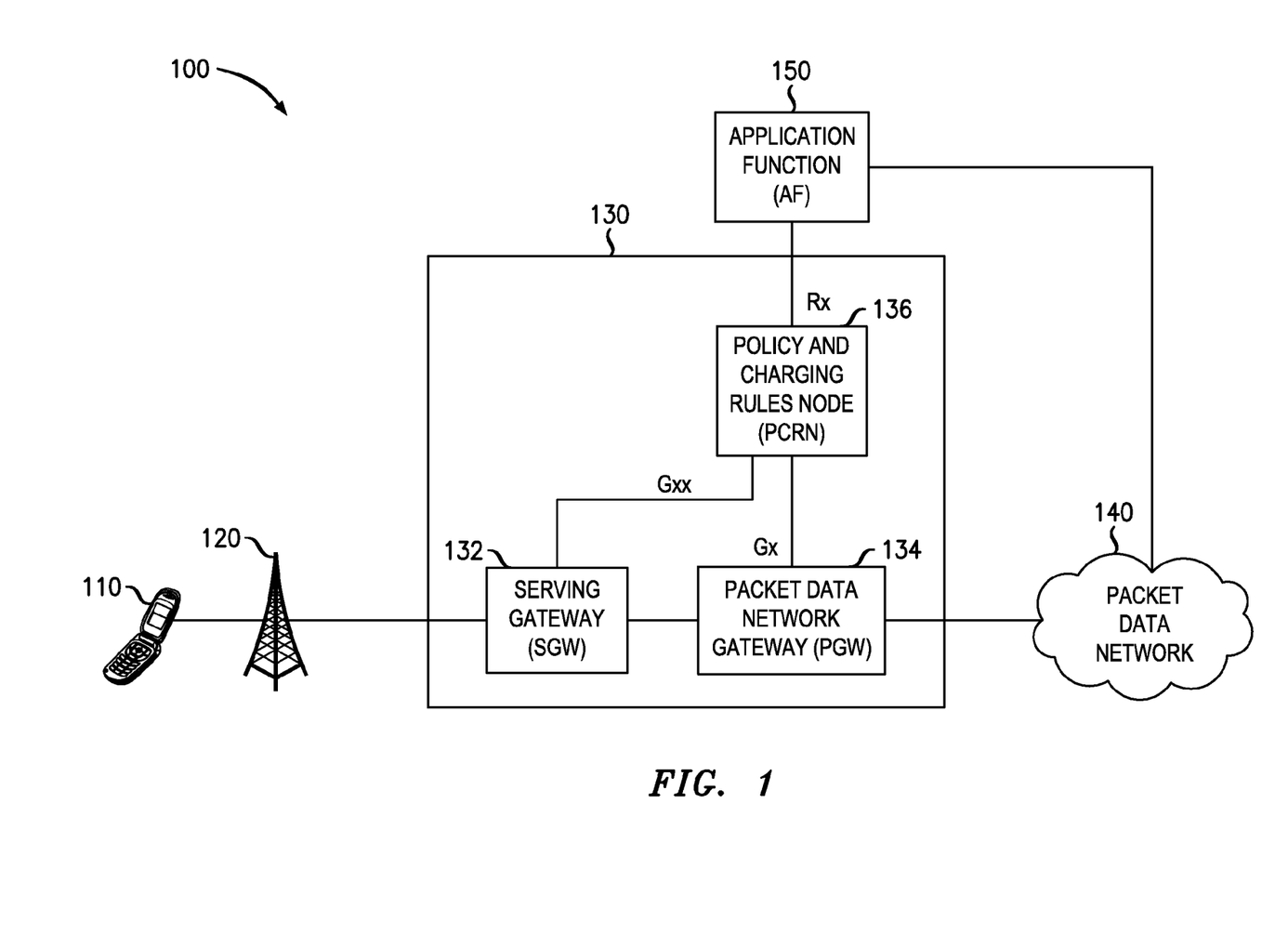
FIG. 1 illustrates an exemplary subscriber network for providing various data services.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment (UE) 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, and a policy and charging rules node (PCRN) 136.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for application services, generates PCC rules, and provides PCC rules to the PGW 134 and/or other PCENs (not shown). PCRN 136 may be in communication with AF 150 via an Rx interface. PCRN 136 may receive network-initiated application requests from AF 150. Upon receipt of such a network-initiated request, PCRN 136 may generate at least one new PCC rule for fulfilling the application request, if the bearer control mode for the associated SDF indicates that network-initiated requests are allowed.

PCRN 136 may also be in communication with SGW 132 and PGW 134 via a Gxx and a Gx interface, respectively. PCRN may receive UE-initiated application requests from UE 110 via the SGW 132 and Gxx interface and/or via the PGW 134 and Gx interface. As with network-initiated application requests, PCRN 136 may generate at least one new PCC rule for fulfilling UE-initiated application requests if the bearer control mode for the associated SDF indicates that UE-initiated requests are allowed.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules for requested SDFs. Upon creating a new QoS rule or upon request by the SGW 132, PCRN 136 may provide a QoS rule to SGW 132 via the Gxx interface.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides an application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing application service to user equipment 110, AF 150 may generate an application request message, such as an AA-Request (AAR) according to the Diameter protocol, to notify the PCRN 136. Alternatively, AF 150 may not communicate with PCRN 136 and, instead, rely on the UE 110 to request the resources necessary to providing the service.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-5.

According to various exemplary embodiments, UE 110 may request the establishment of a new IP-CAN session from the PGW 134 to initiate communication with packet data network 140. PGW 134 may, in turn, construct and transmit a credit control request (CCR) message to request a new IP-CAN session from PCRN 136. PCRN 136 may then establish the requested IP-CAN session. In doing so, PCRN 136 may determine an appropriate bearer control mode for the new session by referring to a set of externalized rules. By comparing these rules to information contained in the request and elsewhere, PCRN 136 may locate a rule applicable to the request and determine that the bearer control mode should be UE_NW. PCRN 136 may then respond to PGW 134 with a credit control answer (CCA) message to indicate that the session may be established and that the bearer control mode is UE_NW. During the normal operation of UE 110 and EPC 130, a number of QoS and/or PCC rules may be created and installed in PGW 134 and SGW 132, respectively.

At a later time, PGW 134 may construct a new CCR message to request a change to the IP-CAN session. When PCRN 136 receives this second CCR message, the PCRN 136 may process the message and again determine a bearer control mode for the IP-CAN session from a set of rules. This time, PCRN 136 may determine that the bearer control mode should be UE_ONLY due to, for example, a change in network node technology. PCRF 136 may then instruct PGW 134 to remove all network-initiated rules associated with the IP-CAN session via a CCA message. PCRN 136 may further instruct AF 150 to initiate a session teardown for any application sessions associated with the IP-CAN session via an abort session request (ASR) message. In various embodiments utilizing gateway control sessions, such as a PMIP deployment, PCRN 136 may also instruct SGW 132 to remove all network-initiated QoS rules associated with the IP-CAN session via a reauthorization request (RAR). Thus, while the bearer control mode was previously UE_NW, the IP-CAN session is now compliant with the UE-ONLY bearer control mode.

Figure 2:
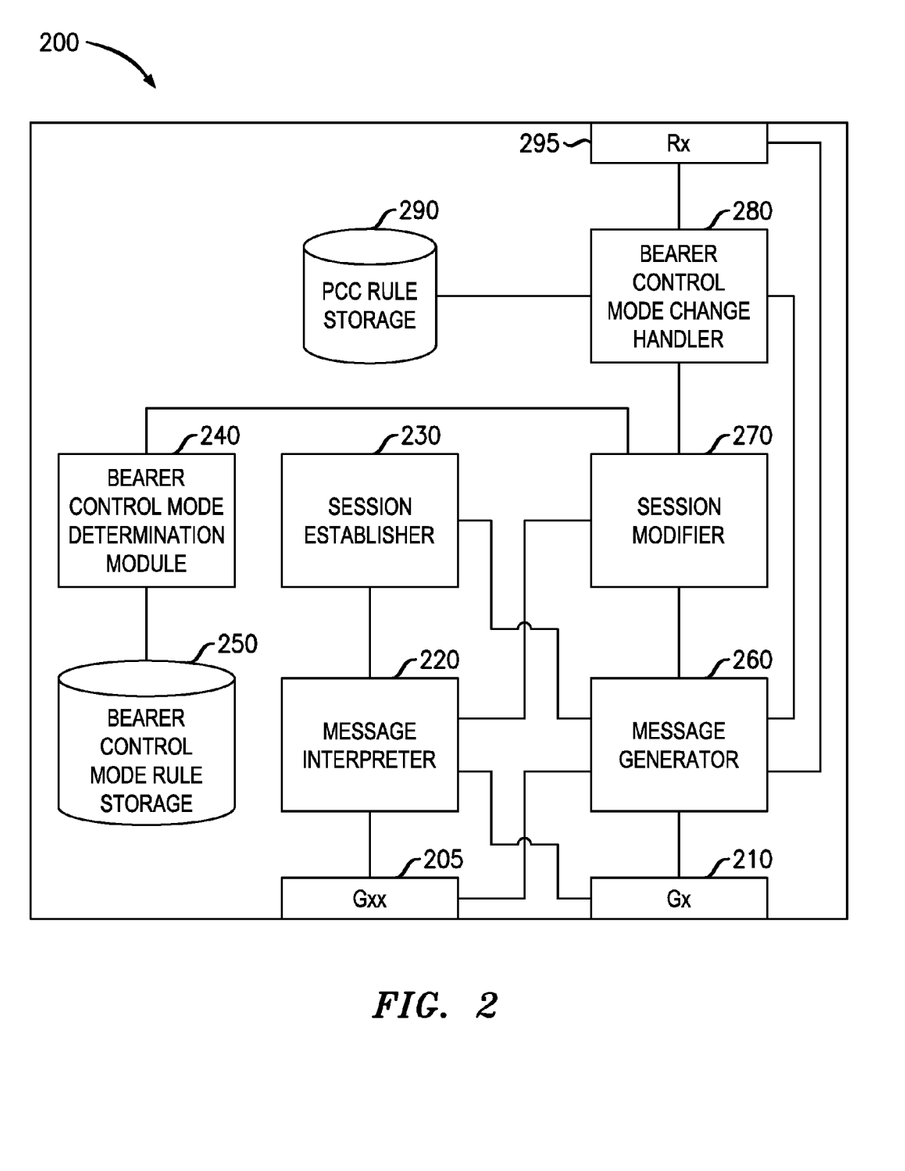
FIG. 2 illustrates an exemplary policy and charging rules node (PCRN) for handling an incoming request message.

FIG. 2 illustrates an exemplary policy and charging rules node (PCRN) 200 for handling an incoming request message. PCRN 200 may correspond to PCRN 136 of exemplary subscriber network 100. PCRN 200 may include a Gxx interface 205, a Gx interface 210, a message interpreter 220, a session establisher 230, a bearer control mode determination module 240, a bearer control mode rule storage 250, a message generator 260, a session modifier 270, a bearer control mode change handler 280, a PCC rule storage 290, and an Rx interface 295.

Gxx interface 205 may be an interface comprising hardware and/or executable instructions encoded on a machine-readable storage medium configured to communicate with an SGW such as SGW 132. Such communication may be implemented according to the 3GPP TS 29.212. Thus, Gxx interface 205 may receive credit control request (CCR) and reauthorization answer (RAA) messages. Gxx interface 205 may further transmit credit control answer (CCA) and reauthorization request (RAR) messages.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive credit control request (CCR) and reauthorization answer (RAA) messages. Gx interface 210 may further transmit credit control answer (CCA) and reauthorization request (RAR) messages.

Message interpreter 220 may include hardware and/or executable instructions on a machine-readable storage medium configured to receive a message via the Gxx interface 205, Gx interface 210, and/or Rx interface 295. Message interpreter 220 may inspect the received message to determine how it should be handled and then pass the message on to the appropriate module for further processing. For example, message interpreter 220 may determine a CCR received via the Gx interface 210 carrying a CC-Request-Type AVP set to a value of "INITIAL_REQUEST" should be passed on to the session establisher 230 for further procession. As another example, message interpreter 220 may determine a CCR received via the Gx interface 210 carrying a CC-Request-Type AVP set to a value of "UPDATE_REQUEST" should be passed on to the session modifier 230 for further procession.

Session establisher 230 may include hardware and/or executable instructions on a machine-readable storage medium configured to establish a new IP-CAN session upon request by a PGW such as PGW 134. Session establisher 230 may also be configured to establish a new gateway control (GWC) session upon request by a SGW such as SGW 132. Session establisher 230 may perform steps known to those of skill in the art as necessary or useful in processing a received request for a new IP-CAN session or GWC session. Session establisher 230 may also request a bearer control mode for the new IP-CAN session or the IP-CAN session associated with the new GWC from bearer control mode determination module 240 and persist the bearer control mode against the IP-CAN session by, for example, storing an association between the IP-CAN session and the bearer control mode value in bearer control mode rule storage 250, PCC rule storage 290, or other storage (not shown). Session establisher 230 may then instruct message generator to construct and send a CCA message including the bearer control mode for the IP-CAN session.

Bearer control mode determination module 240 may include hardware and/or executable instructions on a machine-readable storage medium configured to determine a bearer control mode for an IP-CAN session from contextual information. Such contextual information may include data such as, for example, data contained in a CCR received by the PCRN 200, data stored in bearer control mode rule storage 250, and/or data stored in PCC rule storage 290. The contextual information may describe, for example, the technology supported and/or used by UE 110, base station 12Q SGW 132, and/or PGW 134. Bearer control mode determination module 240 may refer to a number of rules stored in bearer control mode rule storage 250 in order to determine a bearer control mode for the IP-CAN session and pass the value back to the requesting module.

Bearer control mode rule storage 250 may be any machine-readable medium capable of storing predefined rules for use by bearer control mode determination module 240 in determining a bearer control mode for an IP-CAN session. Accordingly, PCC rule storage 290 may include a machine-readable storage medium such as read-only memory (ROM), random-access memory (RAM), magnetic disk storage media, optical storage media, flash-memory devices, and/or similar storage media. As will be described in further detail below with respect to FIG. 3, bearer control mode rule storage 300 may store at least one rule set including a number of rules for determining a bearer control mode from contextual data.

Message generator 260 may include hardware and/or executable instructions on a machine-readable storage medium configured to generate a message for transmission via the Gxx interface 205, Gx interface 210, and/or Rx interface 295. Message generator 260 may be capable of generating various messages such as, for example, a CCA, a RAR, an AAA, and/or an ASR. Message generator 260 may further include specified information within a message upon instruction by the session establisher 230, session modifier 270, or bearer control mode change handler 280. Such specified information may include, for example, PCC rules, QoS rules, a bearer control mode, a rule removal instruction, and/or a session teardown instruction.

Session modifier 270 may include hardware and/or executable instructions on a machine-readable storage medium configured to modify an existing IP-CAN session at the request of a PGW such as PGW 134. For example, session modifier 270 may update an IP-CAN session to use a different SGW after a handover. Session modifier 270 may perform steps known to those of skill in the art as necessary or useful in processing a received request for a modification to an IP-CAN session. Session modifier may also request a bearer control mode for the updated IP-CAN session. from bearer control mode determination module 240 and persist the bearer control mode against the IP-CAN session by, for example, storing an association between the IP-CAN session and the bearer control mode value in bearer control mode rule storage 250, PCC rule storage 290, or other storage (not shown). If the bearer control mode for the IP-CAN session has changed from a previous value, session modifier 250 may inform bearer control mode change handler 280. Session modifier 250 230 may then instruct message generator to construct and send a CCA message including the bearer control mode for the IP-CAN session.

Bearer control mode change handler 280 may include hardware and/or executable instructions on a machine-readable storage medium configured to respond to a change in bearer control mode for a particular IP-CAN session. Bearer control mode change handler 280 may perform different steps depending on whether the bearer control mode has changed to UE_ONLY or UE_NW. If bearer control mode has changed from UE_NW to UE_ONLY, bearer control mode change handler 280 may refer to PCC rule storage 290 to identify any network-initiated PCC rules associated with the IP-CAN session. Bearer control mode change handler 280 may then instruct message generator 260 to include an instruction to remove the identified PCC rules in a CCA message. Bearer control mode change handler 280 may further instruct message generator 260 to construct at least one RAR message to instruct at least one AF such as AF 150 to initiate a session teardown for an application session associated with the IP-CAN session. In various embodiments, such as those including a PMIP deployment, bearer control mode change handler 280 may also instruct the message generator to generate a RAR instructing an SGW to remove any QoS rules associated with the identified PCC rules.

If, on the other hand, bearer control mode has changed from UE_ONLY to UE_NW, bearer control mode change handler 280 may refer to PCC rule storage 290 to identify any UE-initiated PCC rules. In various embodiments, such as those including a PMIP deployment, bearer control mode change handler 280 may then instruct message generator to construct a RAR indicating that an SGW should initiate GWC session teardown and remove QoS rules associated with the identified PCC rules. Bearer control mode change handler 280 may also refer to PCC rule storage 290 or elsewhere (not shown) to identify any deferred PCC rules or network-initiated application requests. As will be described in further detail below with respect to FIG. 4, PCC rule storage may indicate a deferral time for any deferred PCC rules or requests. If such deferral time has not expired, bearer control mode change handler 280 may instruct message generator 260 to include the deferred PCC rules in a CCA for installation by a PGW. In various alternative embodiments, such deferral functionality may be accomplished by placing the PCC rule or application request in a deferral queue (not shown) for later processing. In such a case, bearer control mode change handler 280 may instead search the deferral queue for any unexpired PCC rules or requests to be installed or fulfilled.

PCC rule storage 290 may be any machine-readable medium capable of storing PCC rules generated by the PCRN 200. Accordingly, PCC rule storage 290 may include a machine-readable storage medium such as read-only memory (ROM), random-access memory (RAM), magnetic disk storage media, optical storage media, flash-memory devices, and/or similar storage media. PCC rule storage 290 may store definitions of numerous PCC rules created by PCRN 200. Such definitions may include, for example, rule names, service data flow filters, QoS parameters, and charging parameters. As will be described in further detail below with respect to FIG. 4, PCC rule storage 290 may store additional information related to PCC rules such as, for example, an associated IP-CAN session identifier, in indication of whether the rule was network-initiated or UE-initiated, an indication of whether a rule has been deferred, and/or an amount of time left for a rule deferral.

Rx interface 295 may be an interface comprising hardware and/or executable instructions encoded on a machine-readable storage medium configured to communicate with an AF such as AF 150. Such communication may be implemented according to the 3GPP TS 29.214. Thus, Rx interface 295 may receive AA request (AAR) and abort session answer (ASA) messages. Rx interface 295 may further transmit AA answer (AAA) and abort session request (ASR) messages.

Figure 3:
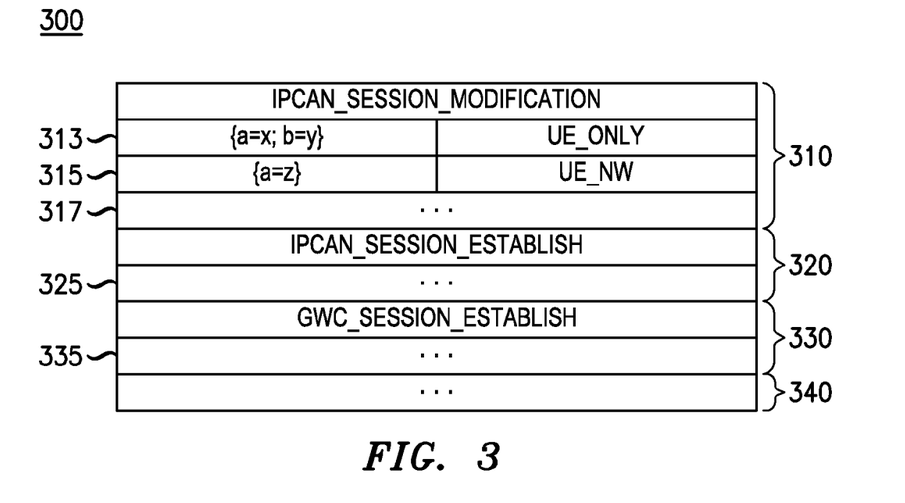
FIG. 3 illustrates an exemplary rule set for determining a bearer control mode.

FIG. 3 illustrates an exemplary rule set 300 for determining a bearer control mode. Rule set 300 may be, for example, a table in a database stored in bearer control mode rule storage 250. Alternatively, rule set 300 could be a series of linked lists, an array, or a similar data structure. Thus, it should be apparent that rule set 300 is an abstraction of the underlying data; any data structure suitable for storage of this data may be used.

Rule set 300 may include multiple rule tables 310, 320, 330, 340 for use in varying contexts for the determination of a bearer control mode. Thus, rule set 300 may include IPCAN_Session_Modification table 310 for use in determining a bearer control mode in connection with the receipt of a CCR requesting modification to an existing IP-CAN session. Likewise IPCAN_Session_Establish table 320 and GWC_Session_Establish table 330 may be used use in determining a bearer control mode in connection with the receipt of a CCR requesting the establishment of a new IP-CAN session or GWC session, respectively. Rule set 300 may include numerous additional rule tables 340.

IPCAN_Session_Modification table 310 may include a number of rules 313, 315, 317 for determining an appropriate bearer control mode. Each rule may indicate at least one criterion for determining whether the rule is applicable and at least one result for indicating a value for the bearer control mode. As an example, rule 313 indicates that if the expressions "a=x" and "b=y" evaluate to "true," then the bearer control mode should be UE_ONLY. It should be noted that the criteria "a=x" and "b=y" are an abstraction and that actual criteria used may be used to further determine a context for the request. Thus, the actual criteria used may, for example, determine a technology supported by the UE and/or which SGW is currently serving a UE. Numerous other useful criteria will be apparent to those of skill in the art.

As a further example, rule 315 indicates that if the expression "a=x" evaluates to 'true,' then the bearer control mode should be UE_NW. Bearer control mode determination module 240 may evaluate rule 315 may be evaluated by bearer control mode determination module 240 if and only if bearer control mode determination module 240 previously evaluated rule 313 was and found it to be inapplicable. Alternatively, bearer control mode determination module 240 may use any other method known to those of skill in the art for evaluating a number of rules to find a single rule to apply. IPCAN_Session_Modification table 310 may include numerous additional rules 317. As with IPCAN_Session_Modification table 310, IPCAN_Session_Establish table 320 and GWC_Session_Establish table 330 may include numerous rules 325, 335 for determining a bearer control mode.

In various embodiments, rule set 300 may be predefined to cover all or some possible contexts for determination of a bearer control mode. In various alternative embodiments, rule set 300 may not be predefined by the manufacturer. Various embodiments allow for a user or network manager to define new rules for inclusion in rule set 300, thus providing flexibility to the PCRN in bearer control mode determination.

Figure 4:
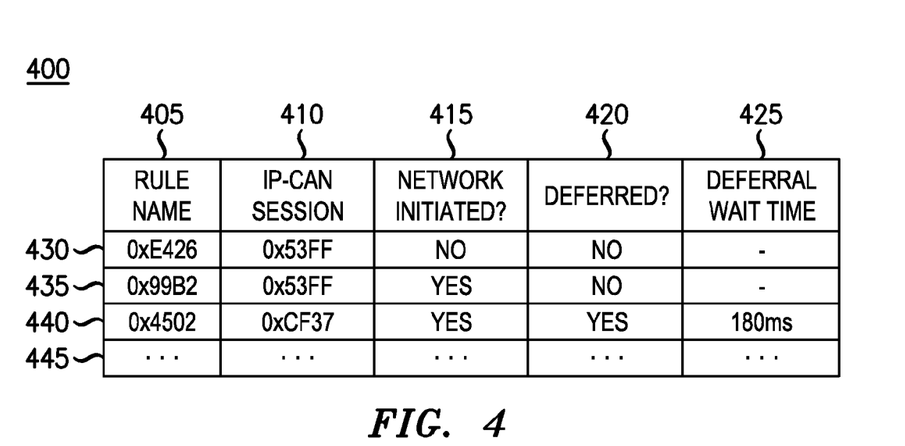
FIG. 4 illustrates an exemplary data arrangement for storing data related to PCC rules.

FIG. 4 illustrates an exemplary data arrangement 400 for storing data related to PCC rules. Data arrangement 400 may be, for example, a table in a database stored in PCC rule storage 290 or another storage (not shown). Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include a rule name field 405, IP-CAN session field 410, network-initiated field 415, deferred field 420, and deferral wait time field 425. In various embodiments, data arrangement 400 may additionally include additional fields (not shown) required or useful in defining a PCC rule such as, for example, a service data flow filter field, a flow status field, a QoS parameters field, a charging parameters field, a service identifier field, a precedence field, and/or a monitoring key field. In various alternative embodiments, data arrangement 400 may cross-reference a different rule definition arrangement (not shown) via rule name field 405.

Rule name field 405 may be used to uniquely identify each PCC rule. IP-CAN session field 410 may identify an IP-CAN session associated with the given rule. Network initiated field 415 may indicate whether the given rule was network-initiated or UE-initiated. Deferred field 420 may indicate whether a given rule has been deferred for possible future installation. Deferral wait time field 425 may indicate an amount of time, measured in any predetermined unit of time, to wait before abandoning a deferred rule. In various alternative embodiments, deferred field 420 may not be present and the deferred status of a rule may be inferred from the fact that deferral wait time field 425 holds a value. In various alternative embodiments, neither deferred field 420 nor deferral wait time field 425 may be present and deferred rules or requests may simply be placed at the end of a deferral queue (not shown) for future processing.

As an example, record 430 shows that the rule identified by "0xE426" is associated with the IP-CAN session identified by "0x53FF." The rule was UE-initiated and is not currently deferred. As a further example, record 435 shows that the rule identified by "0x99B2" is also associated with the IP-CAN session identified by "0x53FF." The rule was network-initiated and is not currently deferred. As another example, record 440 shows that the rule identified by "0x4502" is associated with the IP-CAN session identified by "0xCF37." The rule was network-initiated and is currently deferred for a period of 180 milliseconds. Data arrangement 400 may contain numerous additional records 445.

Figure 5A:
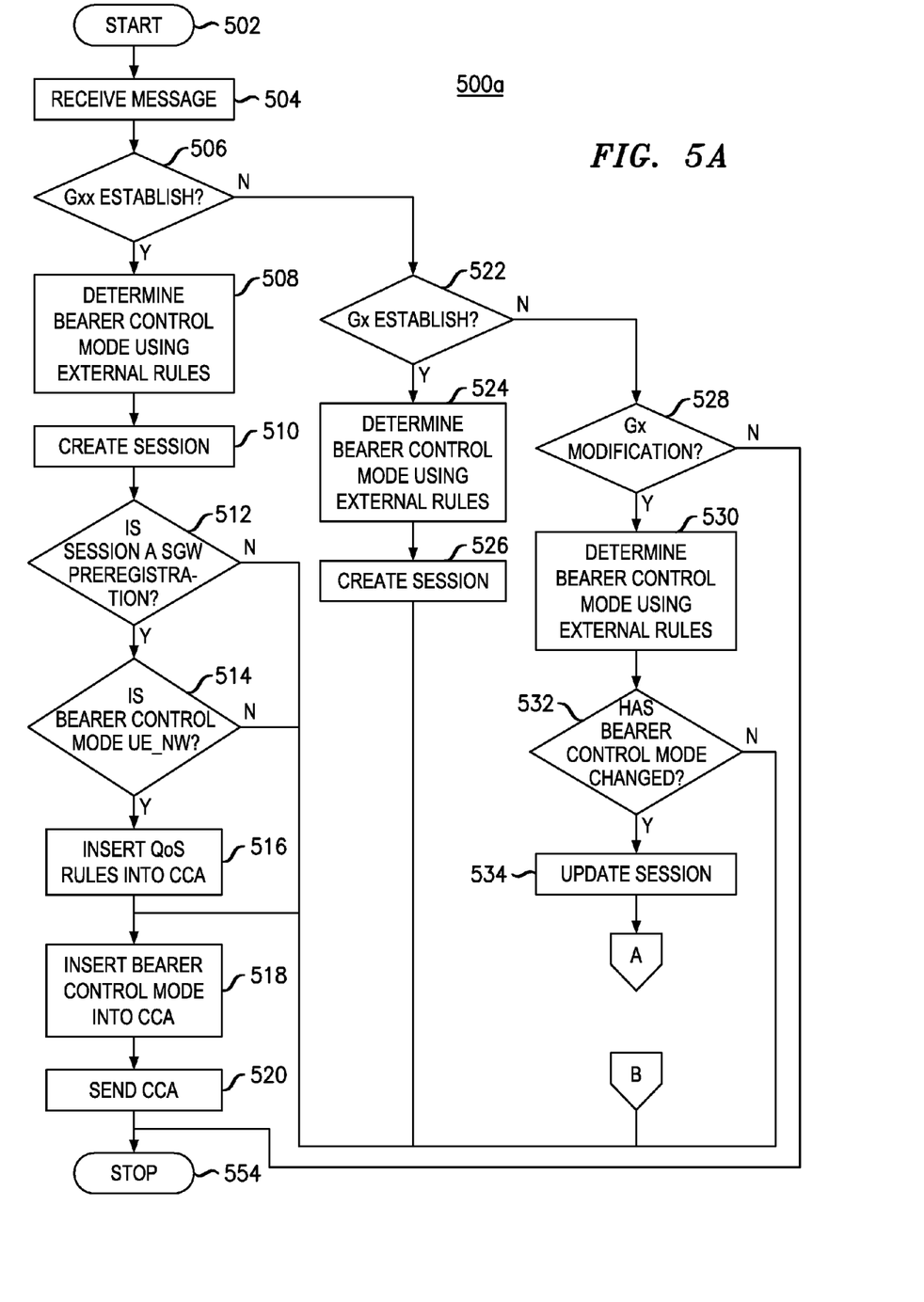
FIGS. 5A-B illustrate an exemplary method for handling an incoming request message.
Figure 5B:
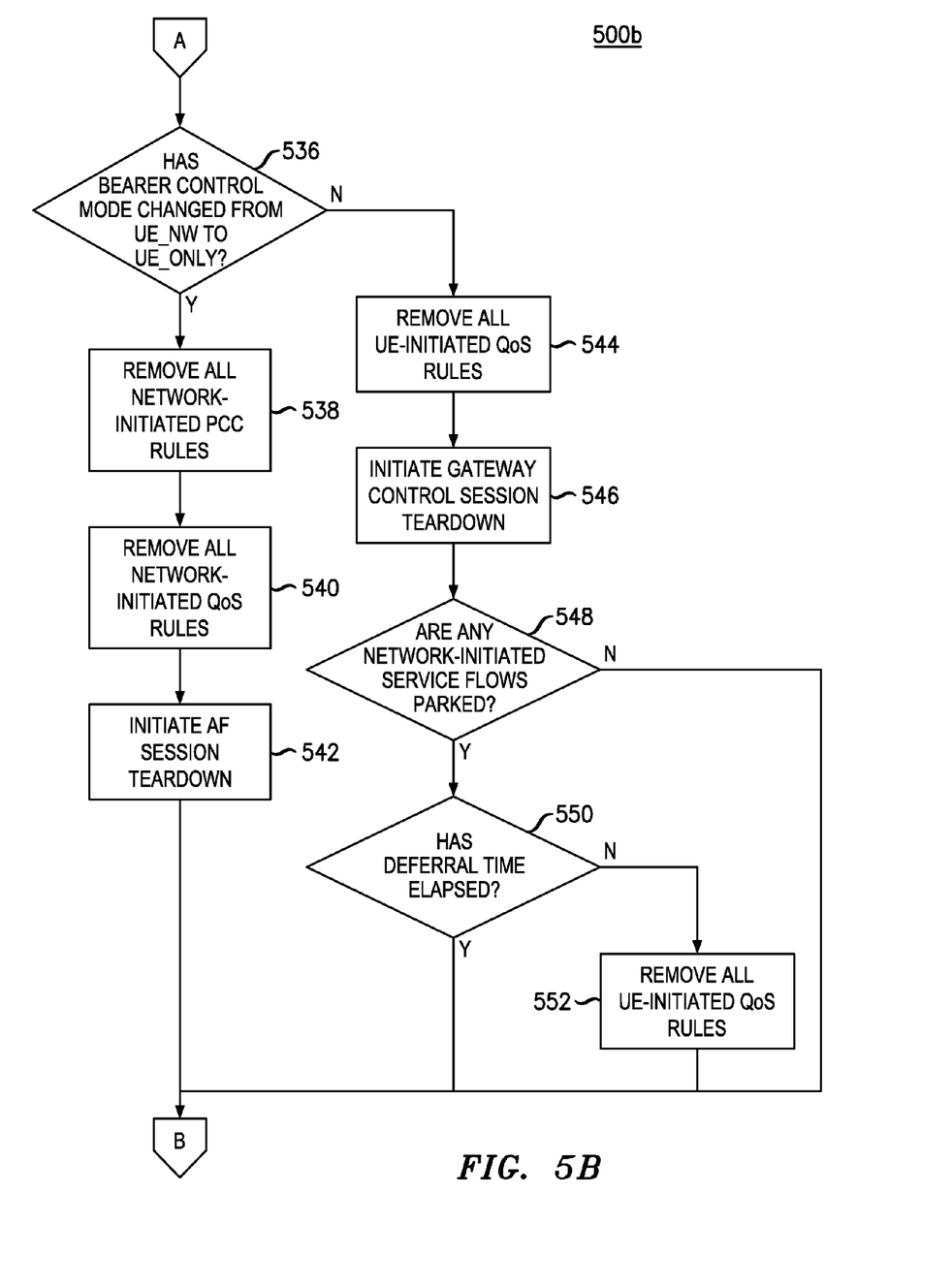

FIGS. 5A-B illustrate an exemplary method 500a, 500b for handling an incoming request message. Method 500a, 500b may be performed by the components of PCRN 136 and/or PCRN 200 to respond to incoming request messages, including determining a bearer control mode and handling any changes to the bearer control mode.

Method 500a, 500b may begin in step 502 and proceed to step 504 where message interpreter 220 may receive a message, such as a CCR message, via the Gxx interface 205 or Gx interface 210. Method 500a, 500b may then proceed to step 506, where message interpreter 220 may determine whether the message is an establishment request received via the Gxx interface 205 by, for example, examining a CC-Request-Type AVP.

If the message is a Gxx establishment request such as, for example, a request for a new GWC, method 500a, 500b may proceed to step 508 where session establisher 230 may request a bearer control mode from bearer control mode determination module 240. Bearer control mode determination module 240 may consult an appropriate rule table using contextual information to determine an appropriate bearer control mode and return the value to session establisher 230. Session establisher 230 may then, in step 510 perform steps known to those of skill in the art as necessary or helpful in fulfilling a request for a GWC session.

Method 500a, 500b may then proceed to step 512 where session establisher 230 may determine whether the GWC request is an SGW preregistration. If so, session establisher may determine whether the bearer control mode for the associated IP-CAN session is UE_NW. If this is also true, session establisher 230 may pass QoS rules associated with the SGW preregistration to message generator for inclusion in the CCA under construction. If however, the session is not an SGW preregistration or the bearer control mode is UE_ONLY, method 500a, 500b will proceed from step 512 or step 514, respectively, directly to step 518.

In step 518, message generator may insert the bearer control mode, received from either the session establisher 230 or the session modifier 280, into the CCA message under construction. Message generator 260 may then transmit the CCA to the appropriate node in step 520 and method 500a, 500b may end in step 554.

If, however, message interpreter 220 determines in step 506 that the received message is not a Gxx establish message, method 500a, 500b may proceed to step 522 where message interpreter 220 may determine whether the received message is a Gx establish request by, for example, examining a CC-Request-Type AVP. If the received message is a Gx establish message such as, for example, a request for a new IP-CAN session, method 500a, 500b may proceed to step 524 where session establisher 230 may request a bearer control mode from bearer control mode determination module 240. Bearer control mode determination module 240 may consult an appropriate rule table using contextual information to determine an appropriate bearer control mode and return the value to session establisher 230. Session establisher 230 may then, in step 526 perform steps known to those of skill in the art as necessary or helpful in fulfilling a request for a new IP-CAN session. Method 500a, 500b may then proceed to step 518.

If message interpreter determines in step 522 that the message is not a Gx establish message, method 500a, 500b may proceed to step 528. In step 528, message interpreter 220 may determine whether the message is a Gx modification request by, for example, examining a CC-Request-Type AVP. If the received message is not a Gx modification request, method 500a, 500b may simply end in step 554. Note that in various embodiments, PCRN 200 may perform additional processing on the received massage prior to method 500a, 500b ending in step 554.

If the message is a Gx modification message such as, for example, a request for an update to an existing IP-CAN session, method 500a, 500b may proceed to step 530 where session modifier 270 may request a bearer control mode from bearer control mode determination module 240. Bearer control mode determination module 240 may consult an appropriate rule table using contextual information to determine an appropriate bearer control mode and return the value to session establisher 230. Session modifier 270 may then, in step 532 determine whether the bearer control mode for the IP-CAN session has changed by comparing the returned bearer control mode to a bearer control mode previously associated with the IP-CAN session. If the bearer control mode has not changed, Method 500a, 500b may proceed to step 518.

If, however, the bearer control mode has changed, method 500a, 500b may proceed to step 534 where session modifier 270 may perform steps known to those of skill in the art as necessary or useful in updating the IP-CAN session according to the request and/or new bearer control mode. Bearer control mode change handler 280 may then, in step 536 determine whether the bearer control mode has changed from UE_NW to UE_ONLY. If so, method 500a, 500b may proceed to step 538.

In step 538, bearer control mode change handler 280 may identify any network-initiated rules associated with the IP-CAN session and instruct message generator 260 to include an indication that the identified rules should be removed in the CCA under construction. In various embodiments, such as those including a PMIP deployment, bearer control mode change handler 280 may also, in step 540, instruct the message generator 260 to construct and send a RAR to the appropriate SGW, indicating that that the QoS rules associated with the identified PCC rules should be removed. Finally, in step 542, bearer control mode change handler 280 may instruct message generator 260 to construct at least one ASR destined for at least one AF, indicating that the AF should begin a session teardown for an application session associated with the IP-CAN session. Method 500a, 500b may then proceed to step 518.

If the bearer control mode change handler determines in step 536 that the bearer control mode has instead changed from UE_ONLY to UE_NW, method 500a, 500b may proceed to step 544. In various embodiments, such as those including a PMIP deployment, bearer control mode change handler 280 in step 544, identify any UE-initiated PCC rules associated with the IP-CAN session and associated QoS rules. Bearer control mode change handler 280 may then instruct message generator 260 to construct a RAR message indicating that an appropriate SGW should remove the identified QoS rules. In step 546, bearer control mode change handler 280 may also instruct the message generator 548 to include an indication the SGW should initiate a GWC session teardown in the RAR message.

Method 500a, 500b may then proceed to step 548 where bearer control mode change handler 280 may determine whether there are any deferred PCC rules of flow requests for the IP-CAN session by, for example, referring to PCC rule storage 290 or a deferral queue (not shown). If there are no deferred PCC rules or flow requests, method 500a, 500b may proceed to step 518. If there are deferred flow requests, however, method 500a, 500b may proceed to step 550 where bearer control mode change handler 280 may determine whether the deferred PCC rules or requests have expired. If the deferred PCC rules or requests have expired method 500a, 500b may proceed to step 518. Otherwise, in step 552, bearer control mode change handler 280 may instruct message generator 260 to include an indication that the deferred, non-expired PCC rules should be installed by the PGW. In the case of an implementation that defers requests rather than PCC rules, PCRN 200 may create PCC rules for fulfillment of the deferred requests at this point. Method 500a, 500b may then proceed to step 518.

Having described exemplary components and methods for the operation of exemplary subscriber network 100 and PCRN 200, an example of the operation of exemplary network 100 and PCRN 200 will now be provided with reference to FIGS. 1-6. PCRN 136 may correspond to PCRN 200. The contents of bearer control mode rule storage 250 may be indicated by rule set 300 and the contents of PCC rule storage 280 may be indicated by data arrangement 400.

The process may begin when PCRN receives a request for a modification to IP-CAN session 0x53FF via Gx interface 210. Message interpreter may identify the message as a Gx modification request in step 528 and pass the message to session modifier 270. Session modifier 270 may, in step 530, request a bearer control mode from bearer control mode determination module 240. Bearer control mode determination module 240 may then refer to IPCAN_Session_Modification table 310 to determine the bearer control module for the IP-CAN session. Referring to rule 313, bearer control mode determination module 240 may determine that, because abstracted variable "a" is equal to abstracted value "x" and abstracted variable "b" is equal to abstracted value "y," the bearer control mode should be UE_ONLY. Then, in step 532, session modifier 270 may determine that the bearer control mode has changed by referring to a previous value for the bearer control mode of the IP-CAN session. Session modifier 270 may then update the IP-CAN session accordingly in step 534.

In step 536, bearer control mode change handler 280 may determine the bearer control mode has changed from UE_NW to UE_ONLY. Thus, method 500a, 500b may proceed to step 538, where PCRN 136, 200 may instruct the PGW 134 to remove rule "0x99B2" because it was network-initiated. Note that rule "0xE426" is not removed because it was UE-initiated and is thus still valid under the new bearer control mode. PCRN 136, 200 may further instruct SGW 132 to remove the QoS rule associated with PCC rule "0x99B2" and AF 150 to initiate session teardown in steps 540 and 542. Respectively. Finally, PCRN 136, 200 may transmit a CCA containing the new bearer control mode to PGW 134 in steps 518 and 520. Thus, the IP-CAN session has changed bearer control modes and only the rules and sessions remaining valid remain installed.

According to the foregoing, various exemplary embodiments provide for the proper handling of requests requiring a determination of a bearer control mode. Particularly, by providing a set of externalized rules, the PCRN may determine what bearer control mode is applicable in various contexts. Various embodiments further provide for the assurance of compliance with a bearer control mode after the bearer control mode has changed. By removing invalid rules after a bearer control mode change, the PCRN may ensure that only compliant rules and session remain.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for handling an incoming request message, the method comprising:
   receiving, at the PCRN, a request message from an Evolved Packet Core node;
   determining that the request message includes a request for a modification to an IP-CAN session; and
   in response to determining that the request message includes a request for a modification to the IP-CAN session:
      determining a current bearer control mode for the IP-CAN session by evaluating at least one rule, wherein the at least one rule comprises:
         a criteria section for determining whether the at least one rule is applicable based on data carried by the request message, and
         a result section for indicating a bearer control mode to be used as the current bearer control mode when the rule is applicable,
      determining a previous bearer control mode for the IP-CAN session,
      comparing the current bearer control mode to the previous bearer control mode, and
      when the current bearer control mode is different from the previous bearer control mode, modifying the IP-CAN session according to the current bearer control mode.

2. The method of claim 1, wherein the step of modifying the IP-CAN session according to the current bearer control mode comprises, when the current bearer control mode is UE_ONLY, at least one of the following:
   indicating to a Packet Data Network Gateway (PGW) that the PGW should remove at least one policy and charging control (PCC) rule associated with the IP-CAN session that was installed in response to a network-initiated request;
   indicating to a serving gateway (SGW) that the SGW should remove at least one quality of service (QoS) rule associated with the IP-CAN session that was installed in response to a network-initiated request; and
   indicating to an application function (AF) that the AF should initiate a session teardown for an application session associated with the IP-CAN session.

3. The method of claim 1, wherein the step of modifying the IP-CAN session according to the current bearer control mode comprises, when the current bearer control mode is UE_NW, at least one of the following:
   indicating to an SGW that the SGW should remove at least one quality of service (QoS) rule associated with the IP-CAN session; and
   indicating to an SGW that the SGW should initiate a session teardown of a gateway control session associated with the IP-CAN session.

4. The method of claim 3, wherein the step of modifying the IP-CAN session according to the current bearer control mode further comprises:
   when the current bearer control mode is UE_NW, determining whether at least one network-initiated service flow has been previously deferred; and
   when at least one network-initiated service flow has been previously deferred, indicating to a PGW that the PGW should install at least one PCC rule associated with the at least one network-initiated service flow.

5. The method of claim 1, wherein the step of evaluating the at least one rule comprises:
   retrieving the at least one rule for determining a current bearer control mode from a bearer control mode rule storage.

6. The method of claim 1, further comprising:
   receiving a subsequent request message;
   determining that the subsequent request message includes a request for an establishment of a new IP-CAN session; and
   in response to determining that the subsequent request message includes a request for an establishment of a new IP-CAN session, referring to at least one external rule to determine a bearer control mode for the new IP-CAN session.

7. The method of claim 1, further comprising:
   receiving a subsequent request message;
   determining that the subsequent request message includes a request for an establishment of a new gateway control session; and
   in response to determining that the subsequent request message includes a request for an establishment of a new gateway control session, referring to at least one external rule to determine a bearer control mode for an IP-CAN session associated with the new gateway control session.

8. The method of claim 7, further comprising:
   determining whether the new gateway control session is a service gateway pre-registration;
   when the new gateway control session is a service gateway pre-registration, determining whether the bearer control mode for an IP-CAN session associated with the new gateway control session is UE_NW; and when the bearer control mode for an IP-CAN session associated with the new gateway control session is UE_NW, indicating to an SGW that it should install at least one QoS rule.

9. A policy and charging rules node (PCRN) for handling an incoming request message, the PCRN comprising:
at least one interface that receives a request message from an Evolved Packet Core node;
a bearer control mode determination module that determines a current bearer control mode for an IP-CAN associated with the request message by evaluating at least one rule, wherein the at least one rule comprises:
a criteria section for determining whether the at least one rule is applicable based on data carried by the request message, and
a result section for indicating a bearer control mode to be used as the current bearer control mode when the rule is applicable;
a message interpreter that determines that the request message includes a request for a modification to an IP-CAN session;
a session modifier that, in response to the message interpreter determining that the request message includes a request for a modification to the IP-CAN session, determines whether the current bearer control mode for the IP-CAN session matches a previous bearer control mode for the IP-CAN session;
a bearer control mode change handler that, when the current bearer control mode for the IP-CAN session does not match the previous bearer control mode for the IP-CAN session, modifies the IP-CAN session according to the current bearer control mode, wherein, in modifying the IP-CAN session according to the current bearer control mode, the bearer control mode change handler:
determines whether the current bearer control mode is UE_ONLY, and
when the current bearer control mode is UE_ONLY, instructs the message generator to construct a message informing a Packet Data Network Gateway (PGW) that the PGW should remove at least one policy and charging control (PCC) rule associated with the IP-CAN session that was installed in response to a network-initiated request while preserving the IP-CAN session for continued use; and
a message generator that constructs at least one response message to be transmitted to at least one node.

10. The PCRN of claim 9, wherein, in modifying the IP-CAN session according to the current bearer control mode, the bearer control mode change handler further:
when the current bearer control mode is UE_ONLY:
instructs the message generator to construct message informing a serving gateway (SGW) that the SGW should remove at least one quality of service (QoS) rule associated with the IP-CAN session that was installed in response to a network-initiated request, and
instructs the message generator to construct a message informing an application function (AF) that the AF should initiate a session teardown for an application session associated with the IP-CAN session.

11. The PCRN of claim 9, wherein, in modifying the IP-CAN session according to the current bearer control mode, the bearer control mode change handler:
determines whether the current bearer control mode is UE_NW; and
when the current bearer control mode is UE_NW:
instructs the message generator to construct a message informing an SGW that the SGW should remove at least one quality of service (QoS) rule associated with the IP-CAN session; and
instructs the message generator to construct a message informing an SGW that the SGW should initiate a session teardown of a gateway control session associated with the IP-CAN session.

12. The PCRN of claim 10, further comprising:
a bearer control mode rule storage that stores a plurality of rules for determining a bearer control mode including the at least one rule, each rule of the plurality of rules including a criteria section and a result section;
wherein, in evaluating the at least one rule the bearer control mode determination module:
retrieves at least a first rule of the plurality of rules.

13. The PCRN of claim 10, wherein the message interpreter further determines that a subsequent request message includes a request for the establishment of a new session, and further comprising:
a session establisher that, in response to determining that the subsequent request message includes a request for the establishment of a new session:
refers to the bearer control mode determination module to determine a bearer control mode for the new session, and
instructs the message generator to construct a message to the Evolved Packet Core node including the bearer control mode.

14. A non-transitory machine-readable storage medium encoded with instructions for handling an incoming request message, the machine-readable storage medium comprising:
instructions for receiving a request message from an Evolved Packet Core node;
instructions for determining that the request message includes a request for a modification to the IP-CAN session; and
instructions for, in response to determining that the request message includes a request for a modification to the IP-CAN session:
determining a current bearer control mode for the IP-CAN session by evaluating at least one rule, wherein the at least one rule comprises:
a criteria section for determining whether the at least one rule is applicable based on data carried by the request message, and
a result section for indicating a bearer control mode to be used as the current bearer control mode when the rule is applicable,
determining a previous bearer control mode for the IP-CAN session,
comparing the current bearer control mode to the previous bearer control mode, and
when the current bearer control mode is different from the previous bearer control mode, modifying the IP-CAN session according to the current bearer control mode.

15. The non-transitory machine-readable storage medium of claim 14, wherein the instructions for modifying the IP-CAN session according to the current bearer control mode comprise, instructions for, when the current bearer control mode is UE_ONLY, at least one of the following:
indicating to a Packet Data Network Gateway (PGW) that the PGW should remove at least one policy and charging control (PCC) rule associated with the IP-CAN session that was installed in response to a network-initiated request;

indicating to a serving gateway (SGW) that the SGW should remove at least one quality of service (QoS) rule associated with the IP-CAN session that was installed in response to a network-initiated request; and indicating to an application function (AF) that the AF should initiate a session teardown for an application session associated with the IP-CAN session.

16. The non-transitory machine-readable storage medium of claim 14, wherein the instructions for modifying the IP-CAN session according to the current bearer control mode comprise instructions for, when the current bearer control mode is UE_NW, at least one of the following:

indicating to an SGW that the SGW should remove at least one quality of service (QoS) rule associated with the IP-CAN session; and indicating to an SGW that the SGW should initiate a session teardown of a gateway control session associated with the IP-CAN session.

17. The non-transitory machine-readable storage medium of claim 16, wherein instructions for modifying the IP-CAN session according to the current bearer control mode further comprise:

instructions for, when the current bearer control mode is UE_NW, determining whether at least one network-initiated service flow has been previously deferred; and instructions for, when at least one network-initiated service flow has been previously deferred, indicating to a PGW that the PGW should install at least one PCC rule associated with the at least one network-initiated service flow.

18. The non-transitory machine-readable storage medium of claim 14, wherein the instructions for evaluating the at least one rule comprise:

instructions for retrieving the at least one rule for determining a current bearer control mode from a bearer control mode rule storage.

19. The non-transitory machine-readable storage medium of claim 14, further comprising:

instructions for determining that a subsequent request message includes a request for an establishment of a new IP-CAN session; and instructions for, in response to determining that a subsequent request message includes a request for an establishment of a new IP-CAN session, referring to at least one external rule to determine a bearer control mode for new IP-CAN session.

20. The non-transitory machine-readable storage medium of claim 14, further comprising:

instructions for determining that a subsequent request message includes a request for an establishment of a new gateway control session; and instructions for, in response to determining that the request message includes a subsequent request for an establishment of a new gateway control session, referring to at least one external rule to determine a bearer control mode for an IP-CAN session associated with the new gateway control session.

\* \* \* \* \*